United States Patent [19]
Kato et al.
[11] 4,168,338
[45] Sep. 18, 1979

[54] TRANSFER SHEET WITH TONER-RECEIVING LAYER OF THERMOPLASTIC AND THERMOSETTING POLYMERS

[75] Inventors: Mamoru Kato; Susumu Yamaura, both of Hirakata; Yasutoki Kamezawa, Kyoto; Tatsuo Aizawa, Osaka, all of Japan

[73] Assignee: Mita Industrial Company Limited, Osaka, Japan

[21] Appl. No.: 831,862

[22] Filed: Sep. 9, 1977

[30] Foreign Application Priority Data

Sep. 24, 1976 [JP] Japan ............................... 51/113595

[51] Int. Cl.$^2$ ............................................ B32B 27/38

[52] U.S. Cl. .................................... 428/219; 428/416; 428/448; 428/914; 428/451; 428/463; 428/514; 428/516; 428/520; 428/414; 427/146; 96/1.4; 96/1 SD; 355/16

[58] Field of Search ............... 428/448, 451, 500, 914, 428/463, 414, 514, 416, 516, 520; 96/1 A, 1 SD

[56] References Cited

U.S. PATENT DOCUMENTS

| | | | |
|---|---|---|---|
| 3,697,171 | 10/1972 | Sullivan | 96/1.4 |
| 3,993,825 | 11/1976 | Buchan et al. | 96/1.4 X |

FOREIGN PATENT DOCUMENTS 50-117435 of 1975 Japan .

OTHER PUBLICATIONS

Derwent Abs., World Patent Reports, W33, p. 26, R24, G03d-h, J2419W/33.

*Primary Examiner*—P. C. Ives
*Attorney, Agent, or Firm*—Sherman & Shalloway

[57] ABSTRACT

A transfer sheet for electrostatically transferring thereon an electrically conductive or electrically semiconductive toner in electrostatic photography or electrostatic printing, which comprises a substrate and a toner-receiving layer formed on at least one surface of the substrate, which toner-receiving layer contains a composition comprising (A) a thermoplastic acrylic polymer having a carboxyl group content of 2 to 30% by weight and (B) a thermosetting resin reactive with the acrylic polymer (A), and a process for preparing this transfer sheet by using an aqueous coating composition are disclosed. In this transfer sheet, the electric resistance can be maintained at a high level even under high humidity conditions, and a toner image can be transferred on this transfer sheet at a high transfer efficiency.

11 Claims, No Drawings

TRANSFER SHEET WITH TONER-RECEIVING LAYER OF THERMOPLASTIC AND THERMOSETTING POLYMERS

BACKGROUND OF THE INVENTION (1) Field of the Invention

This invention relates to a transfer sheet and a process for the preparation thereof. More particularly, the invention relates to a transfer sheet for electrostatically transferring an electrically conductive or electrically semi-conductive toner in electrostatic photography or electrostatic printing.

(2) Description of the Prior Arts

As one of dry developers (toners) for developing electrostatic latent images formed by electrostatic photography or the like, a so-called electroconductive or semi-conductive magnetic toner capable of performing development without the aid of a particular carrier is known. As the toner of this type, there have heretofore been used toners formed by dispersing powder of a magnetic material such as triiron tetroxide, if necessary with a conducting agent such as carbon black, into a binder resin and molding the dispersion into granules. As means for improving the electric conductivity in these toners, there have ordinarily been adopted a method in which the amount of the conducting agent incorporated in the magnetic material-binder resin dispersion is increased and a method in which the conducting agent is embedded in the above-mentioned toner particles. By adopting these methods, toner particles are provided with such property that they can be magnetically attracted, and improved electric conductivity is imparted to surfaces of toner particles.

These magnetic toners have an advantage that sharp and clear toner images having a much reduced edge effect can be obtained according to the magnetic brush development method even without use of a magnetic carrier or the like. However, they have a defect that if toner images formed on photosensitive layers for electrostatic photography or electrostatic printing, such as photoconductive layers, are transferred onto copy papers, contours of the transferred images become obscure and no sharp images can be obtained.

BRIEF SUMMARY OF THE INVENTION

It is therefore a primary object of this invention to provide a transfer sheet for use in electrostatic photography or electrostatic printing which enables to electrostatically transfer images of an electrically conductive or electrically semi-conductive toner without the above-mentioned defect.

Another object of the invention is to provide a transfer sheet for use in electrostatic photography or electrostatic printing in which the electric resistance on the surface can be maintained at a high level even under high humidity conditions and which enables to electrostatically transfer a toner image formed on a photosensitive layer for electrostatic photography or electrostatic printing at a high transfer efficiency irrespective of the humidity while keeping sharp contours of the image.

Still another object of the invention is to provide a process for preparing such transfer sheet for electrostatic photography or electrostatic printing, which comprises forming on a paper substrate a toner-receiving layer having a high electric resistance in which the dependency of the electric resistance on the humidity is much reduced, by using an aqueous coating resin composition.

In accordance with one fundamental aspect of this invention, there is provided a transfer sheet for electrostatically transferring thereon an electrically conductive or electrically semi-conductive toner in electrostatic photography or electrostatic printing, which comprises a substrate and a toner-receiving layer formed on at least one surface of said substrate, said toner-receiving layer containing a composition comprising (A) a thermoplastic acrylic polymer having a carboxyl group content of 2 to 30% by weight and (B) a thermosetting resin reactive with said acrylic polymer (A).

In accordance with another fundamental aspect of this invention, there is provided a process for preparing a transfer sheet for electrostatically transferring thereon an electrocally conductive or electrically semi-conductive toner, which comprises coating on at least one surface of a substrate an aqueous composition containing (A) a thermoplastic acrylic polymer having a carboxyl group content of 2 to 30% by weight in the form of an aqueous emulsion and (B) a thermosetting resin reactive with said acrylic polymer (A) in the form of an aqueous solution and drying the coated substrate to form a toner-receiving layer on the surface of the substrate.

DETAILED DESCRIPTION OF THE PREFERRED EMBODIMENTS

The most important feature of this invention is based on the finding that in a transfer sheet comprising a toner-receiving layer formed of a composition of (A) a thermoplastic acrylic polymer having a carboxyl group content of 2 to 30% by weight, especially 3 to 10% by weight, and (B) a thermosetting resin reactive with said acrylic polymer (A), the electric resistance of the surface is maintained at a high level irrespective of influences of the humidity and this transfer sheet has such characteristic property that a toner image formed on a photosensitive layer for electrostatic photography or electrostatic printing can be transferred on this transfer sheet at a high transfer efficiency while keeping sharp contours of the image.

A toner image formed on a zinc oxide photosensitive layer for use in electrostatic photography or electrostatic printing has a good contrast and a sharp edge. However, when toner images formed on such photosensitive layers are transferred onto untreated high quality papers which have heretofore been broadly used as transfer sheets, as is seen from results of Comparison Test 1 given hereinafter, in the transferred images the density is drastically reduced and broadening of contours takes place. As a result, no sharp transferred images can be obtained.

As means for eliminating this defect, Japanese Patent Application Laid-Open Specification No. 117435/75 (Japanese Patent Application No. 13929/74) proposes a method in which a layer for receiving an electrically conductive or electrically semi-conductive toner is formed on at least one surface of a substrate so that the volume resistivity of the surface is at least $3\times10^{13}\Omega$-cm, and it also is taught that a medium such as a resin, a wax, an oil, an insulating filler or the like is applied to the surface of the substrate for forming such toner-receiving layer. As suitable resins for formation of the toner-receiving layer, acrylic resins, silicone resins, vinyl acetate resins and alkyd resins are mentioned in the above-mentioned Laid-Open Specification.

Transfer sheets having a toner-receiving layer of such resin are advantageous in that toner images can be transferred thereon without broadening of contours of images under relatively low humidity conditions. However, under high humidity conditions broadening of contours of toner images are caused at the transfer step and the efficiency of transfer of toner images are relatively low. Accordingly, these transfer sheets are still unsatisfactory.

In contrast, according to this invention, by selecting an acrylic resin having a carboxyl group content in a specific range and combining it with a thermosetting resin reactive therewith, it is made possible to form a toner-receiving layer on which an image of an electrically conductive or electrically semi-conductive toner can be transferred at a high transfer efficiency without broadening of contours.

This will readily be understood from results of Comparison Tests given hereinafter. More specifically, when an acrylic resin having a carboxyl group content lower than 2% by weight (emulsification is impossible) or an acrylic resin having a carboxyl group content higher than 30% by weight is employed (Comparison Test 3), in transfer of an electrically conductive toner under high humidity conditions, reduction of the transfer efficiency or broadening of contours of the transferred image is caused. When an acrylic resin alone is employed (Comparison Test 2), the dependency of the toner image transfer characteristics on the humidity is drastically enhanced. In contrast, when this acrylic resin is combined with a thermosetting resin reactive therewith, the humidity dependency can be remarkably reduced.

Any of thermoplastic acrylic polymers can be used in this invention, so far as the carboxyl group content is in the above-mentioned range. As suitable examples of such acrylic polymer, there can be mentioned copolymers consisting essentially of (1) 4 to 60% by weight of at least one member selected from ethylenically unsaturated carboxylic acids such as acrylic acid, methacrylic acid, maleic anhydride, fumaric acid, crotonic acid and itaconic acid and (2) 96 to 40% by weight of at least one member selected from ethylenically unsaturated monomers exclusive of the above-mentioned ethylenically unsaturated carboxylic acids, such as esters of methacrylic acid, e.g., methyl methacrylate, acrylic acid esters, e.g., methyl acrylate, ethylenically unsaturated nitriles, e.g., acrylonitrile and methacrylonitrile, aromatic vinyl compounds, e.g., styrene, α-methylstyrene and vinyl toluene, vinyl esters, e.g., vinyl acetate, and vinyl chloride and vinylidene chloride. As the ethylenically unsaturated monomer (2), there are preferably employed acrylic acid esters, methacrylic acid esters and mixtures thereof.

The acrylic polymer that is most preferred for working this invention is a copolymer consisting of (a) units represented by the following formula:

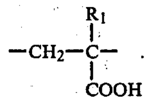

wherein $R_1$ stands for a hydrogen atom or a lower alkyl group having up to 4 carbon atoms, and (b) units represented by the following formula:

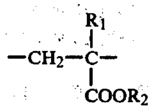

wherein $R_1$ is as defined above and $R_2$ stands for a lower alkyl group having up to 4 carbon atoms, and it is especially preferred that this copolymer be composed of 4 to 60% by weight of the units (a) and 96 to 40% by weight of the units (b) and the units (b) be composed of a mixture of 1 part by weight of a methacrylic acid ester with 0.02 to 0.06 part by weight, particularly 0.05 to 0.3 part by weight, of an acrylic acid ester.

Another preferred example of the copolymer that is used in the present invention is a copolymer consisting of (a) 4 to 60% by weight of units represented by the following formula:

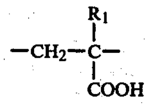

wherein $R_1$ stands for a hydrogen atom or a lower alkyl group having up to 4 carbon atoms, (b) 10 to 75% by weight of units represented by the following formula:

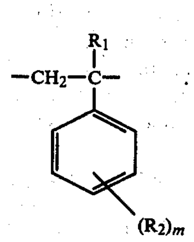

wherein $R_1$ is as defined above, $R_2$ stands for a lower alkyl group having up to 4 carbon atoms, and m is 0 or 1, and (c) 0 to 86% by weight of units represented by the following formula:

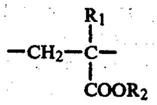

wherein $R_1$ and $R_2$ are as defined above.

In this invention, it is important that the carboxyl group content in the acrylic polymer (grams of carboxyl groups in 100 g of the polymer) should be in the range of 2 to 30% by weight, especially 3 to 10% by weight.

In this invention, the molecular weight of the thermoplastic acrylic polymer is not particularly critical, so far as it has a film-forming molecular weight.

As the thermosetting resin (B) reactive with the thermoplastic acrylic polymer (A), any of thermosetting resins having groups capable of reacting with carboxyl groups in the acrylic polymer, such as epoxy groups, methylol groups, dimethylene ether groups ($-CH_2-O-CH_2-$) and acetal groups [$-CH_2(OCH_2)_n-O-$], can be used in this invention.

Suitable examples of such thermosetting resin include epoxy resins, melamine resins, urea resins, phenolic resins and xylene resins, recited in the order of importance. Two or more of these resins can be used in combination.

As the epoxy resin, there can be mentioned glycidyl ethers of polyhydroxy compounds and glycidyl esters of polycarboxylic acids, which are represented by the following general formula:

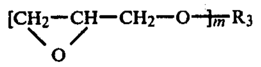

wherein $R_3$ stands for the residue of the polyhydroxy compound or polycarboxylic acid, and m is a number of at least 2.

As the polyhydroxy compound, there can be mentioned, for example, (1) polyhydric phenols such as 4,4'-dihydroxydiphenylpropane (bisphenol A), tetrachlorobisphenol A and tetrahydroxytetraphenylethane, (2) novolak type phenolic resins, and (3) aliphatic polyols such as adducts of ethylene oxide to glycerin, polyethylene glycol, polypropylene glycol and triols. As the polycarboxylic acid, there can be mentioned phthalic acid, polymethacrylic acid and polyacrylic acid.

In order to form a toner-receiving layer which is substantially non-sensitive to the humidity and has a high electric resistance, glycidyl ethers of polyhydroxy compounds, such as glycidyl ethers of polyalkylene polyols, e.g., polyethylene glycol and polypropylene glycol, especially a glycidyl ether of polyethylene glycol, are preferred.

In general, it is preferred that the epoxy equivalent of the epoxy resin used to 100 to 400, especially 200 to 300.

As the melamine resin, there can be used methylol melamines obtained by reacting triazine ring compounds such as melamine, guanamine, acetoguanamine and benzoguanamine with formaldehyde in an amount of 2 to 6 moles per mole of the triazine ring compound, modified methylol melamines obtained by methylating or butylating the foregoing methylol melamines with methanol, butanol or the like alcohol, and precondensates thereof.

As the urea resin, there can be used precondensates obtained by reacting urea with formaldehyde (in an amount of 1 to 2 moles per mole of urea) in the presence of an alkali catalyst, and products obtained by etherifying methylol groups left in the foregoing precondensates with methanol, butanol or the like.

As the phenolic resin, there can be used known resol-type phenolic resins, and as the xylene resin, there can be employed XF resins obtained by reacting xylene with formaldehyde in the presence of an acid catalyst, which may be modified with a known modifier according to need.

In the present invention, it is preferred that the acrylic polymer (A) and the thermosetting resin (B) be used at a mixing weight ratio (A):(B) ranging from 100:5 to 100:100, especially 100:10 to 100:50, based on solids. When the amount of the thermosetting resin is too large beyond the above range or too small below the above range, as is seen from results of Comparison Test 4 given hereinafter, electrically conductive toner transfer characteristics tend to be degraded.

Another prominent advantage of this invention is that a toner receiving layer having a highly electrically insulating property which is hardly influenced by moisture in air can be applied in the form of an aqueous composition. In general, when a resin is applied in the form of an aqueous composition, there are attained various advantages. For example, an expensive solvent neet not be used and troubles such as pollution of air are not caused. However, the resulting resin coating film is highly sensitive to the humidity and its electric characteristics are readily influenced by moisture in air and drastically degraded.

In contrast, according to the present invention, the acrylic polymer (A) and the thermosetting resin (B) can be used in combination in the form of an aqueous emulsion and in the form of an aqueous solution, respectively, and when an aqueous composition of both the components (A) and (B) is coated and they are reacted with each other, the influences of the humidity can be remarkably moderated.

An aqueous emulsion of the acrylic polymer is easily available in the form of a self-emulsifiable emulsion comprising the above-mentioned monomers or it can easily be obtained by polymerizing the above-mentioned monomers in water in the presence of an anionic emulsifier and/or a non-ionic emulsifier and a water-soluble radical initiator according to known means. Such easily available emulsions can be directly used for the preparation of an aqueous composition for formation of a toner-receiving layer. In order to prevent reduction of the electrically insulating property at a high humidity, it is preferred that a self-emulsifiable emulsion that can easily be obtained according to known means be used as it is.

In such self-emulsifiable emulsion of the acrylic polymer, the acrylic polymer is present in the form of an ammonium salt. When the emulsion is coated on a substrate and is then dried, ammonia is readily split from the polymer and an acrylic polymer having free carboxyl groups is obtained. When these carboxyl groups are reacted with the thermosetting resin, there is obtained a resin coating layer in which no humidity-sensitive component is present after drying. Therefore, according to the present invention, there is obtained a transfer sheet which is hardly influenced by the humidity.

The above-mentioned thermosetting resin (B) or its precondensate is water-soluble in many cases and such resin can be used in the form of an aqueous solution for formation of an aqueous coating composition. When the thermosetting resin is poor in water solubility or its aqueous solution lacks stability, a water-miscible organic solvent such as methanol, ethanol, butanol, cellosolves, acetone or the like may be used for enhancing the water solubility of the resin.

In view of the facility in the coating operation, it is preferred that the acrylic polymer (A) and the thermosetting resin (B) be present in the aqueous coating composition in a total resin amount of 5 to 40% by weight, especially 5 to 20% by weight.

In order to improve the toner-retaining property, graphic characteristics, adaptability to sealing, touch and other properties in the resulting transfer sheet, it is preferred that the resinous composition for formation of the toner-receiving layer comprises finely divided silica prepared according to the dry method in an amount of 10 to 100 parts by weight, especially 20 to 50 parts by weight, per 100 parts by weight of the acrylic polymer (A). By the term "finely divided silica prepared according to the dry method" used herein is meant ultra-fine particulate silica prepared by decomposing silicon tetrachloride according to the dry method, and it is commercially available under the tradename "AEROSIL". This finely divided silica prepared according to the dry method is different from and advantageous over finely divided silica prepared by decomposing sodium silicate or the like according to the wet method, such as so-called white carbon in the point that the above-mentioned properties such as graphic characteristics and touch can be remarkably enhanced without substantial increase of the humidity dependency of electric characteristics.

When an extender pigment such as clay is incorporated in the resinous composition, the electric characteristics of the resulting transfer sheet is greatly influenced by the humidity, the transfer efficiency is degraded and broadening of contours is readily caused in the transferred image. Accordingly, use of such extender pigment must be avoided. However, rutile type titanium dioxide can be incorporated in the above resinous composition without such bad influences in an amount of 10 to 500 parts by weight per 100 parts by weight of the acrylic polymer (A). By incorporation of rutile type titanium dioxide, the whiteness of the toner-receiving layer can be improved, but this titanium dioxide is inferior to the above-mentioned finely divided silica prepared according to the dry method with respect to the effect of improving the touch.

As the substrate on which a toner-receiving layer is formed, there can be used papers such as cellulose fiber papers, e.g., tissue paper, high quality paper, art paper, tracing paper and raw paper for copying, resin films such as transparent films, matted films and foamed films, synthetic papers prepared from artificial fibers, fabrics such as non-woven fabrics, woven fabrics and knitted fabrics and metals such as metal foils and metal sheets. For ordinary copying, papers are most preferably employed.

Coating of the aqueous composition on the substrate can easily be accomplished by using known coating mechanisms such as an air doctor coater, a blade coater, a rod coater, a knife coater, a squeegee coater, a dip coater, a reverse roll coater, a transfer roll coater, a spray coater and a curtain coater. In the paper-making step, the resinous composition of this invention may be incorporated into pulp together with a sizing agent, clay and the like, or in the paper-making process, the composition may be applied by impregnation or coating using a sizing press or the like.

In this invention, it is preferred that the toner-receiving layer be formed in a dry coat amount of 2 to 20 $g/m^2$, especially 5 to 10 $g/m^2$.

In order to promote the reaction between the acrylic polymer (A) and the thermosetting resin (B) in the resinous composition for formation of the toner-receiving layer, the coated resinous composition may be heated, for example, at 80° to 200° C. for 10 seconds to 5 minutes. This heating treatment may be conducted separately from drying of the coating layer of the aqueous composition on the substrate, but in general, it is advantageous that the heating treatment is conducted simultaneously with drying of the coating layer.

According to this invention, a transfer sheet for electrostatic photography or electrostatic printing having a toner-receiving layer composed of the above-mentioned resinous composition is formed in the foregoing manner. This transfer sheet is advantageously used as a copying paper or printing paper for electrostatically transferring thereon an electrically conductive or electrically semi-conductive toner.

The toner-receiving layer of the transfer sheet of this invention is characterized in that the humidity dependency of electric characteristics is conspicuously reduced. As will be apparent from data shown on Table 1 given hereinafter, in commercial transfer papers, the saturation voltage is lower than 200 V as measured at a temperature of 20° C. and a relative humidity of 40% but the saturation voltage is substantially 0 (zero) V as measured at a temperature of 40° C. and a relative humidity of 100%. In contrast, in the transfer paper of this invention, the saturation voltage is higher than 400 V as measured at a temperature of 20° C. and a relative humidity of 40% and it is maintained at such a high level exceeding 300 V under such high humidity conditions as a temperature of 40° C. and a relative humidity of 100%.

The "saturation voltage" referred to in the instant specification means an electrostatic potential formed on the surface of the toner-receiving layer when a voltage of −5 KV is applied for 10 seconds to the toner-receiving layer of the sample transfer paper by using, for example, an electrostatic paper analyzer Model SP-428 manufactured by Kawaguchi Denki Seisakusho.

In the transfer sheet of this invention, the saturation voltage retention ratio under high humidity conditions ($R\gamma$), which is defined by the following formula:

$$R\gamma = V_{100}/V_{40}$$

wherein $V_{40}$ indicates the saturation voltage of the transfer sheet as measured at a temperature of 20° C. and a relative humidity of 40% and $V_{100}$ represents the saturation voltage of the transfer sheet as measured at a temperature of 40° C. and a relative humidity of 100%, is at least 0.7, preferably at least 0.8.

Since the transfer paper of this invention is excellent in electric characteristics of the toner-receiving layer as pointed out above and also since the humidity dependency of these electric characteristics is conspicuously reduced, when an electrically conductive or electrically semi-conductive toner is transferred onto this transfer paper from a photosensitive plate for electrostatic photography or electrostatic printing, very sharp and clear images can always be obtained.

In preparing prints according to electrostatic photography using the transfer sheet of this invention, electrically conductive or electrically semi-conductive toner images can be formed according to any of known processes for electrostatic photography.

For example, a photosensitive layer composed mainly of a photoconductor such as zinc oxide, selenium or the like, which is formed on a substrate plate, is charged by corona discharge or the like, and actinic rays are applied imagewise to form an electrostatic image corresponding to the light image on the surface of the photosensitive layer. This electrostatic image is developed by a magnetic brush of an electrically conductive or electrically semi-conductive toner to form a toner image corresponding to the electrostatic image.

As the electrically conductive or electrically semi-conductive toner, there is employed a toner formed by dispersing a fine powder of a magnetic material in a binder medium and, if necessary, imparting electric conductivity to surfaces of particles. Toner particles having a volume resistivity in the range of from $10^2$ to $10^9\Omega$-cm are preferably employed. A typical recipe of such electrically conductive or electrically semi-conductive toner is as follows:

| | |
|---|---|
| Binder (wax, resin or the like) | 30 to 60 ω by weight |
| Fine powder of magnetic material (triiron tetroxide or the like) | 30 to 60% by weight |
| Conducting agent (carbon black or the like) | 0.5 to 2% by weight |

The electrically conductive or electrically semi-conductive toner image formed in the foregoing manner is then transferred on the transfer paper of this invention. This transfer operation may be performed according to any of known processes. For example, the toner-receiving layer of the transfer sheet of this invention is brought in contact with the electrically conductive or electrically semi-conductive toner image on the photosensitive layer, and a transfer voltage is applied to the back surface of the transfer sheet by corona discharge or the like, whereby transfer of the toner from the photosensitive layer to the transfer paper can be accomplished very easily.

The transferred toner image is tightly fixed by known fixing means, for example, thermal fusion fixing, pressure fixing or the like.

The transfer paper of this invention shows a very high transfer efficiency of 70% or more not only under normal low humidity conditions but also under high humidity conditions such as a relative humidity of 100%, and a fixed image excellent in the density and contrast can be formed on the transfer paper of this invention.

This invention will now be described in detail by reference to the following Comparison Tests and Examples.

COMPARATIVE TEST 1

In order to show that the transfer sheet of this invention prepared by using a specific resinous composition for forming a toner-receiving layer is conspicuously excellent over transfer sheets customarily used with respect to the transfer efficiency, stability under high humidity conditions and broadening-preventing effect, the following test was conducted.

[1] Preparation of Transfer Sheets (1-1) Transfer Sheet of This Invention:

A composition having the following recipe was prepared as a coating liquid for forming a toner-receiving layer:

| | |
|---|---|
| Water | 500 g |
| Silica (AEROSIL # 200 manufactured by Nippon Aerosil K. K.) | 15 g |
| Acrylic resin (JURYMER ET-410 manufactured by Nippon Junyaku K. K.) | 300 g |
| Epoxy resin (DENACOL EX-810 manufactured by Nagase Sangyo K. K.) | 10 g |

This composition was sufficiently dispersed for 5 minutes by means of a homogenizing mixer and was coated on a raw paper for a photosensitive paper (manufactured by Sanyo Kokusaku Pulp K. K.; base weight=58 $g/m^2$) in a dry coat amount of about 5 $g/m^2$ by a rod bar coater (rod bar diameter=0.3 mm). The coated base paper was dried at 120° C. for 1 minute to obtain a transfer sheet (A) for electrostatic photography or electrostatic printing.

(1-2) Conventional Transfer Sheets:

The following transfer sheets were tested as conventional transfer sheets.

| | |
|---|---|
| Commercial product (B): | plain paper copying sheet manufactured by Company B |
| Commercial product (C): | plain paper copying sheet manufactured by Company C |
| Commercial product (D): | plain paper copying sheet manufactured by Company D |
| Raw paper (E) for photosensitive paper: | raw paper for diazo-type photosensitive paper manufactured by Company E |

[2] Measurement Methods (2-1) Transfer Efficiency:

A black image on an original was developed and transferred on each of the foregoing sample transfer sheets by using a toner transfer tester manufactured by Mita Industrial Company (photosensitive plate=zinc oxide, applied voltage=−5 KV), and each sample was evaluated on the transfer efficiency. The transfer efficiency referred to herein is a value calculated according to the following formula:

$$TE\,(\%) = \frac{TT}{RT + TT} \times 100$$

wherein TE stands for the transfer efficiency, TT stands for the amount of the toner transferred on the transfer sheet and RT designates the amount of the toner left on the zinc oxide photosensitive plate after the transfer test.

Incidentally, the quantity of the toner was determined by flowing a solvent (acetone), dissolving out the toner with the solvent and measuring the weight of the toner.

(2-2) Sharpness, Broadening and Feel:

The image on the transfer sheet was evaluated by the naked eye observation with respect to the image sharpness, broadening and feel.

(2-3) Stability against Moisture:

(a) Low Humidity (20° C., 40% RH):

Each sample transfer sheet was allowed to stand for 24 hours in a box maintained at a temperature of 20° C. and a relative humidity (RH) of 40%, and immediately, the charge quantity was measured by an electrostatic paper analyzer Model SP-428 manufactured by Kawaguchi Denki Seisakusho under an applied voltage −5 KV. The voltage-applying time was 10 seconds.

(b) High Humidity (40° C., 100% RH):

Each sample transfer sheet was allowed to stand for 5 hours in a moisture test box (manufactured by Tabai Seisakusho) maintained at a temperature of 40° C. and a relative humidity of 100%, and the charge quantity was immediately measured by an electrostatic paper analyzer Model SP-428 manufactured by Kawaguchi Denki Seisakusho under an applied voltage of −5 KV. The voltage-applying time was 10 seconds.

[3] Measurement Results

Results of the above-mentioned tests are shown in Table 1.

Table 1

| | Properties of Transfer Sheets | | | | | |
|---|---|---|---|---|---|---|
| | 20° C., 40% RH | | | 40° C., 100% RH | | |
| Sample | Charge Quantity (V) | Transfer Efficiency (%) | Sharpness of Transferred Image | Charge Quantity (V) | Transfer Efficiency (%) | Sharpness of Transferred Image |
| Transfer Sheet (A) | 400 | 90-95 | O | 320 | 80-85 | O |
| Commercial Product (B) | 200 | 60-70 | Δ | 0 | 5-10 | X |
| Commercial Product (C) | 100 | 40-50 | Δ | 0 | 5-10 | X |
| Commercial Product (D) | 100 | 40-50 | Δ | 0 | 5-10 | X |
| Commercial Product (E) | 180 | 60-70 | Δ | 0 | 5-10 | X |

Note
The sharpness of the transferred image was evaluated according to the following scale:
O: clear and sharp image with no broadening
Δ: low transfer efficiency with slight broadening
X: conspicuous broadening and halation of contours

[4] Conclusion

As will be apparent from the results shown in Table 1, the transfer sheet (A) according to this invention is prominently excellent over the commercially available transfer sheets (B), (C), (D) and (E) with respect to the charging property, transfer efficiency and transferred image sharpness (conditions of the resulting print) under either low humidity or high humidity conditions.

COMPARISON TEST 2

In order to show that a transfer sheet prepared according to this invention by using a toner-receiving layer-forming composition comprising a thermoplastic acrylic polymer, a thermosetting resin and silica powder prepared according to the dry method is excellent over transfer properties (transfer efficiency, high humidity stability, prevention of boradening and appearance of the transferred image), the following test was conducted.

[1] Preparation of Transfer Sheets (1-1) Transfer Sheet (A) of This Invention:

The transfer sheet (A) prepared in Comparison Test 1 was used as a sample of this invention.

(1-2) Comparative Transfer Sheet (F) (free of thermosetting resin):

A composition of the following recipe was prepared as a coating liquid for forming a toner-receiving layer:

| | |
|---|---|
| Water | 500 g |
| Silica (AEROSIL # 200 manufactured by Nippon Aerosil K. K.) | 15 g |
| Acrylic resin (JURYMER ET-410 manufactured by Nippon Junyaku K. K.) | 300 g |

This composition was sufficiently dispersed for about 5 minutes by a homogenizing mixer and coated on a raw paper for production of a photosensitive paper (manufactured by Sanyo Kokusaku Pulp K. K.; base weight=58 $g/m^2$) in a dry coat amount of about 5 $g/m^2$ by a rod bar coater (rod bar diameter=0.3 mm). The coated paper was dried at 120° C. for 1 minute to form a transfer sheet (F) for electrostatic photography or electrostatic printing.

(1-3) Comparative Transfer Sheet (G) (including silica prepared according to wet method):

A composition having the following recipe was prepared as a coating liquid for forming a toner-receiving layer:

| | |
|---|---|
| Water | 500 g |
| Silica (SYLOID 244 manufactured by Fuli-Davison Kagaku K. K.) | 30 g |
| Acrylic resin (POLYSOL M-17 manufactured by Showa Kobunshi K.K.) | 300 g |
| Melamine resin (MIRBANE SM-850 manufactured by Showa Kobunshi K.K.) | 30 g |

In the same manner as described in (1-2) above, this composition was coated and dried to obtain a transfer sheet (G) for electrostatic photography or electrostatic printing.

(1-4) Comparative Transfer Sheet (H) (including clay as pigment):

A composition having the following recipe was prepared as a coating liquid for forming a toner-receiving layer:

| | |
|---|---|
| Water | 500 g |
| Pigment (ULTRA-WHITE 90 manufactured by Engel Hard Co. Ltd.) | 30 g |
| Acrylic resin (POLYSOL M-17 manufactured by Showa Kobunshi K.K.) | 300 g |
| Melamine resin (MIRBANE SM-850 manufactured by Showa Kobunshi K.K.) | 30 g |

In the same manner as described in (1-2) above, this composition was coated and dried to obtain a transfer sheet (H) for electrostatic photography or electrostatic printing.

(1-5) Comparative Transfer Sheet (I) (formed by using a paper-processing resin customarily used):

A composition having the following recipe was prepared as a coating liquid for forming a toner-receiving layer:

| | |
|---|---|
| Water | 100 g |
| Silica (SNOWTEX P manufactured by Nissan Kagaku K. K.) | 100 g |
| Vinyl acetate resin (MOVINYL DC manufactured by Hoechst Gosei K. K.) | 10 g |

In the same manner as described in (1-2) above, this composition was coated and dried to obtain a transfer sheet (I) for electrosatic photography or electrostatic printing.

[2] Measurement Methods

The so prepared transfer sheets were tested on the transfer efficiency, sharpness, reduction of broadening, stability against high humidity and feel of the resulting print according to the same methods as described in Comparison Test 1.

[3] Measurement Results

Obtained test results are shown in Table 2.

Table 2

| | Properties of Transfer Sheets | | | | | | |
|---|---|---|---|---|---|---|---|
| | 20° C., 40% RH | | | | 40° C., 100% RH | | |
| Sample | Charge Quantity (V) | Transfer Efficiency (%) | Sharpness of Transferred Image | Feel | Charge Quantity (V) | Transfer Efficiency (%) | of Transferred Image |
| Transfer Sheet (A) | 400 | 90–95 | O | good | 320 | 80–85 | O |
| Transfer Sheet (F) | 350 | 90–95 | O | good | 100 | 20–30 | Δ |
| Transfer Sheet (G) | 300 | 60–70 | Δ | good | 50 | 10 -20 | X |
| Transfer Sheet (H) | 250 | 60–70 | X | good | 30 | 10–20 | X |
| Transfer Sheet (I) | 300 | 60–70 | X | good | 30 | 10–20 | X |

Note
The sharpness of the transferred image was evaluated according to the following scale:
O: clear and sharp image with no broadening
Δ: low transfer efficiency and insufficient sharpness with slight broadening
X: conspicuous broadening and halation of contours

[4] Conclusion

As will be apparent from the foregoing test results, the transfer sheet (A) formed by using a composition comprising a thermoplastic acrylic resin, a thermosetting resin and silica prepared according to the dry method as a coating composition according to this invention show stable transfer properties under not only low humidity conditions but also high humidity conditions. In case of the transfer sheet (F) prepared by using a coating composition free of the thermosetting resin, good transfer properties can be obtained under low humidity conditions, but the charge quantity and transfer efficiency are drastically degraded under high humidity conditions and the resulting transferred image is obscure and no satisfactory print can be obtained. In case of the transfer sheets (G) and (H) prepared by using, instead of silica prepared according to the dry method, silica prepared according to the wet method and clay, respectively, satisfactory paper-like feel can be obtained, but the transfer efficiency is low under either low humidity or high humidity conditions and the transferred image is obscure and no satisfactory print can be obtained. Especially under high humidity conditions, no substantial transferred image can be obtained. Further, as in case of the transfer sheets (G) and (H), no satisfactory transfer properties can be obtained in the transfer sheet (I) prepared by using a polyvinyl acetate resin customarily used for processing of paper, and this transfer sheet cannot be used for transfer of images under either low humidity or high humidity conditions.

COMPARATIVE TEST 3

In order to show that if the carboxyl group content is higher than 30% by weight in the thermoplastic acrylic resin used for the toner-receiving layer-forming composition according to this invention, transfer properties of the resulting sheet are drastically degraded, the following test was conducted.

[1] Preparation of Transfer Sheets

[1-1] Transfer Sheet (A) of This Invention:

The transfer sheet (A) prepared in the same manner as described in Comparison Test 1 was used as a sample of this invention.

[1-2] Comparative Transfer Sheet (J) (formed by using composition including acrylic resin having carboxyl group content higher than 30% by weight):

A composition having the following recipe was prepared as a coating liquid for forming a toner-receiving layer:

| | |
|---|---|
| Water | 500 g |
| Silica (AEROSIL # 200 manufactured by Nippon Aerosil | 15 g |
| Acrylic resin (JURIMER AC-10H manufactured by Nippon Junyaku K. K., carboxyl group content being 35% by weight) | 300 g |
| Epoxy resin (DENACOL EX-810 manufactured by Nagase Sangyo K. K.) | 10 g |

This composition was sufficiently dispersed for about 5 minutes by a homogenizing mixer and coated on a raw paper for production of a photosensitive paper (manufactured by Sanyo Kokusaku Pulp K.K., base weight=58 g/m$^2$) in a dry coat amount of about 5 g/m$^2$ by using a rod bar coater (the rod bar diameter being 0.3 mm). The coated paper was dried at 120° C. for 1 minute to form a transfer sheet (J) for electrostatic photography or electrostatic printing.

[2] Measurement Methods

The so prepared transfer sheets were tested in the same manner as described in Comparative Test 1 with respect to the transfer efficiency, sharpness and stability against high humidity.

[3] Test Results

Obtained test results are shown in Table 3.

Table 3

| | Properties of Transfer Sheets | | | | | |
|---|---|---|---|---|---|---|
| | 20° C., 40% RH | | | 40° C., 100% RH | | |
| Sample | Charge Quantity (V) | Transfer Efficiency (%) | Sharpness of Transferred Image | Charge Quantity (V) | Transfer Efficiency (%) | Sharpness of Transferred Image |
| Transfer Sheet (A) | 400 | 90–95 | O | 300 | 80–85 | O |
| Transfer Sheet (J) | 350 | 80–85 | O | 100 | 20–30 | Δ |

Note
The sharpness of the transferred sheet was evaluated according to the following scale:
O: sharp image with no broadening
Δ: low transfer efficiency and obscure contours

[4] Conclusion

From the foregoing results, it will readily be understood that if a thermoplastic acrylic resin having a carboxyl group content higher than 30% by weight is employed, no substantial degradation of properties is observed under low humidity conditions, but under high humidity conditions, since the carboxyl group content is high, the charging property of the resin per se is not good and the transfer efficiency is degraded, so that the transferred image on the resulting print is very obscure.

COMPARISON TEST 4

In order to show that if the amount used of a thermosetting resin reactive with the acrylic polymer is too small or too large in the composition of this invention for forming a toner-receiving layer, the transfer efficiency and stability against high humidity are drastically degraded in the resulting transfer sheet, the following test was conducted.

[1] Preparation of Transfer Sheets (1-1) Transfer Sheet (A) of This Invention:

The same transfer sheet (A) as prepared in Comparison Test 1 was used as a sample of this invention.

(1-2) Comparative Transfer Sheet (K) (amount of thermosetting resin being too small):

A composition having the following recipe was prepared as a coating for forming a toner-receiving layer:

| | |
|---|---|
| Water | 500 g |
| Silica (AEROSIL # 200 manufactured by Nippon Aerosil K.K.) | 15 g |
| Acrylic resin (JURYMER ET-410 manufactured by Nippon Junyaku K.K.) | 300 g |
| Epoxy resin (DENACOL EX-810 manufactured by Nagase Sangyo K.K.) | 2 g |

This composition was sufficiently dispersed for about 5 minutes by means of a homogenizing mixer and coated on a raw paper for production of a photosensitive paper (manufactured by Sanyo Kokusaku Pulp K.K.; base weight=58 g/m$^2$) in a dry coat amount of about 5 g/m$^2$ by using a rod bar coater (the rod bar diameter being 0.3 mm). The coated paper was dried at 120° C. for 1 minute to obtain a transfer sheet (K) for electrostatic photography or electrostatic printing).

(1-3) Comparative Transfer Sheet (L) (amount of thermosetting resin being too large):

A composition having the following recipe was prepared as a coating liquid for forming a toner-receiving layer:

| | |
|---|---|
| Water | 500 g |
| Silica (AEROSIL # 200 manufactured by Nippon Aerosil K.K.) | 15 g |
| Acrylic resin (JURYMER ET-410 manufactured by Nippon Junyaku K.K.) | 300 g |
| Epoxy resin (DENACOL EX-810 manufactured by Nagase Sangyo K.K.) | 100 g |

This composition was coated and dried in the same manner as described in (1-2) above to form a transfer sheet (L) for electrostatic photography or electrostatic printing.

[2] Measurement Methods

The so prepared transfer sheets were tested with respect to the transfer efficiency, sharpness and stability against high humidity according to the methods described in Comparison Test 1.

[3] Test Results

Obtained test results are shown in Table 4.

Table 4

| | Properties of Transfer Sheets | | | | | |
|---|---|---|---|---|---|---|
| | 20° C., 40% RH | | | 40° C., 100% RH | | |
| Sample | Charge Quantity (V) | Transfer Efficiency (%) | Sharpness of Transferred Image | Charge Quantity (V) | Transfer Efficiency (%) | Sharpness of Transferred Image |
| Transfer Sheet (A) | 400 | 90–95 | O | 300 | 80–85 | O |
| Transfer Sheet (K) | 400 | 90–95 | O | 150 | 30–40 | Δ |
| Transfer Sheet (L) | 250 | 50–60 | Δ | 200 | 45–50 | Δ |

Note
The sharpness of the transferred image was evaluated according to the following scale:
O: sharp and clear image with no broadening
Δ: low transfer efficiency with halation of contours

[4] Conclusion

As will be apparent from the foregoing test results, when the amount of the thermosetting resin that is used for the toner-receiving layer-forming composition of this invention is too small, though properties of the resulting transfer sheet are not substantially influenced under low humidity conditions, under high humidity conditions both the charge quantity and transfer efficiency are degraded because of influences of the residual carboxyl groups. It will also be seen that when the amount of the thermosetting resin is too large, since characteristics of the thermosetting resin are directly manifested, the charge quantity and transfer efficiency are reduced under either low humidity or high humidity conditions, and no clear or sharp image can be obtained.

COMPARISON TEST 5

In order to show that if the amount of silica prepared according to the dry method, which is used for the toner-receiving layer-forming composition of this invention, is too small or too large, transfer characteristics (transfer efficiency, stability against high humidity and feed) are conspicuously changed, the following test was conducted.

[1] Preparation of Transfer Sheets (1) Transfer Sheet (A) of This Invention:

The same transfer sheet (A) as prepared in Comparison Test 1 was used as a sample of this invention.

(1-2) Comparative Transfer Sheet (M) (amount of silica being too small):

A composition having the following recipe was prepared as a coating liquid for forming a toner-receiving layer:

| | |
|---|---|
| Water | 500 g |
| Silica (AEROSIL # 200 manufactured by Nippon Aerosil K.K.) | 5 g |
| Acrylic resin (JURYMER ET-410 manufactured by Nippon Junyaku K.K.) | 300 g |
| Epoxy resin (DENACOL EX-810 manufactured by Nagase Sangyo K.K.) | 10 g |

This composition was sufficiently dispersed for 5 minutes by a homogenizing mixer for about 5 minutes and coated on a raw paper for production of a photosensitive paper (manufactured by Sanyo Kokusaku Pulp K.K.; base weight=58 g/m$^2$) in a dry coat amount of about 5 g/m$^2$ by a rod bar coater (the rod bar diameter being 0.3 mm). The coated paper was dried at 120° C. for 1 minute to obtain a transfer sheet (M) for electrostatic photography or electrostatic printing.

(1-3) Comparative Transfer Sheet (N) (amount of silica being too large):

A composition having the following recipe was prepared as a coating liquid for forming a toner-receiving layer:

| | |
|---|---|
| Water | 500 g |
| Silica (AEROSIL # 200 manufactured by Nippon Aerosil K.K.) | 100 g |
| Epoxy resin (DENACOL EX-810 manufactured by Nagase Sangyo K.K.) | 10 g |
| Acrylic resin (JURYMER ET-410 manufactured by Nippon Junyaku K.K.) | 300 g |

In the same manner as described in (1-2) above, this composition was coated and dried to obtain a transfer sheet (N) for electrostatic photography or electrostatic printing.

[2] Measurement Methods

The so prepared transfer sheets were tested with respect to the transfer efficiency, sharpness, feel and stability against high humidity according to the same methods as described in Comparison Test 1.

[3] Test Results

Obtained results are shown in Table 5.

Table 5

| | Properties of Transfer Sheets | | | | | | |
|---|---|---|---|---|---|---|---|
| | 20° C., 40% RH | | | | 40° C., 100% RH | | |
| Sample | Charge Quantity (V) | Transfer Efficiency (%) | Sharpness of Transferred Image | Fee | Charge Quantity (V) | Transfer Efficiency (%) | Sharpness of Transferred Image |
| Transfer Sheet (A) | 400 | 90-95 | O | O | 300 | 80-85 | O |
| Transfer Sheet (M) | 400 | 90-95 | O | X | 320 | 80-85 | O |
| Transfer | 400 | 90-95 | O | X | 200 | 50-60 | Δ |

Notes
(1) The sharpness of the transferred image was evaluated according to the following scale:
O: sharp and clear image with no broadening
Δ: slight halation of contours with slight broadening
(2) The feel of the transfer sheet was evaluated according to the following scale:
O: paper-like feel
X: no paper-like feel

[4] Conclusion

From the foregoing test results, it will be apparent that when the amount of silica prepared according to the dry method is too small, although transfer properties are good and a sharp and clear transferred image can be obtained, the transfer sheet lacks paper-like feel or touch. Namely, the surface has a filmy and lustrous appearance and the graphic property is bad. It will also be seen that because of the moisture-absorbing property of silica the transfer efficiency is degraded under high humidity conditions and the feel of the resulting transfer sheet is not good.

EXAMPLE 1

A composition having the following recipe was prepared as a coating liquid for forming a toner-receiving layer:

| | |
|---|---|
| Water | 500 g |

-continued

| | |
|---|---|
| Silica (AEROSIL # 200 manufactured by Nippon Aerosil K.K.) | 30 g |
| Acrylic resin (POLYSOL M-17 manufactured by Showa Kobunshi K.K.) | 300 g |
| Epoxy resin (DENACOL EX-810 manufactured by Nagase Sangyo K.K.) | 50 g |

This composition was sufficiently dispersed for about 5 minutes by a homogenizing mixer and was coated on a raw paper for production of a photosensitive paper (manufactured by Sanyo Kokusaku Pulp K.K.; base weight=58 g/m$^2$) in a dry coat amount of about 5 g/m$^2$ by a rod bar coater (the rod bar diameter being 0.3 mm). The coated paper was dried at 120° C. for 1 minute to obtain a transfer sheet for electrostatic photography or electrostatic printing. When an original image was reproduced and transferred on this transfer sheet by using a toner transfer tester manufactured by Mita Industrial Company (photosensitive plate=zinc oxide; applied voltage=−5 KV), a sharp and clear image with no broadening was obtained at a transfer efficiency of 95%.

EXAMPLE 2

In the same manner as described in Example 1, a transfer sheet was prepared by using JURYMER ET-410 (acrylic resin manufactured by Nippon Junyaku K.K.) instead of the acrylic resin used in Example 1 (POLYSOL M-17 manufactured by Showa Kobunshi K.K.). The transfer operation was conducted on this transfer sheet in the same manner as described in Example 1. Results similar to the results obtained in Example 1 were obtained.

EXAMPLE 3

In the same manner as described in Example 1, a transfer sheet was prepared by using MOVINYL 700 (acrylic resin manufactured by Hoechst Gosei K.K.) instead of the acrylic resin used in Example 1 (POLYSOL M-17 manufactured by Showa Kobunshi K.K.). The transfer operation was conducted on this transfer sheet in the same manner as described in Example 1. Obtained results were similar to the test results obtained in Example 1.

EXAMPLE 4

A composition having the following recipe was prepared as a coating liquid for forming a toner-receiving layer:

| | |
|---|---|
| Water | 500 g |
| Silica (AEROSIL 380 manufactured by Nippon Aerosil K.K.) | 20 g |
| Acrylic resin (JURYMER AT-510 manufactured by Nippon Junyaku K.K.) | 300 g |
| Melamine resin (MIRBANE SM-850 manufactured by Shown Kobunshi K.K.) | 50 g |

In the same manner as described in Example 1, this composition was coated and dried to obtain a transfer sheet for electrostatic photography or electrostatic printing. The transfer operation was conducted on this transfer sheet in the same manner as described in Example 1 to obtain results similar to the results obtained in Example 1.

EXAMPLE 5

In the same manner as described in Example 4, a transfer sheet was prepared by using a urea resin (MIRBANE SU-118K manufactured by Showa Kobunshi K.K.) instead of the melamine resin used in Example 4 (MIRBANE SM-850 manufactured by Showa Kobunshi K.K.). The transfer operation was conducted on this transfer sheet in the same manner as described in Example 1 to obtain results similar to the results obtained in Example 1.

EXAMPLE 6

The composition prepared in Example 1 was sufficiently dispersed for about 5 minutes by a homogenizing mixer and caoted on a raw paper for production of a photosensitive paper (manufactured by Sanyo Kokusaku Pulp K.K.) in a dry coat amount of 5 g/m$^2$ by an air knife coater. The coated paper was dried to obtain a transfer sheet for electrostatic photography or electrostatic printing. In the same manner as described in Example 1, the transfer operation was conducted on this transfer sheet. Obtained results were similar to the results obtained in Example 1.

EXAMPLE 7

In the same manner as described in Example 1, a transfer sheet was prepared by using an acryl-styrene resin (DAIKALAC S-1307 manufactured by Daido Kasei Kogyo K.K.) instead of the acrylic resin used in Example 1 (POLYSOL M-17 manufactured by Showa Kobunshi K.K.). The transfer operation was conducted on this transfer sheet in the same manner as described in Example 1. Obtained results were similar to the results obtained in Example 1.

EXAMPLE 8

In the same manner as described in Example 1, a transfer sheet was prepared by using VINYSOL MC-106 (acrylic resin manufactured by Daido Kasei Kogyo K.K.) instead of the acrylic resin used in Example 1 (POLYSOL M-17 manufactured by Showa Kobunshi K.K.). The transfer operation was conducted on this transfer sheet in the same manner as described in Example 1. Obtained results were similar to the results obtained in Example 1.

EXAMPLE 9

The same composition as prepared in Example 1 was sufficiently dispersed for about 5 minutes by a homogenizing mixer and was coated on a raw paper for production of a photosensitive paper (manufactured by Sanyo Kokusaku Pulp K.K., base weight=58 g/m$^2$) in a dry coat amount of about 5 g/m$^2$ by an air knife coater and the coated paper was dried to form a toner-receiving layer or one surface of the paper. In the same manner as described above, the above coating composition was coated on the other surface of the paper in a dry coat amount of about 5 g/m$^2$ and the coated paper was dried to obtain a transfer sheet for electrostatic photography or electrostatic printing having a toner-receiving layer on each surface. In the same manner as described in Example 1, the transfer operation was conducted on both the surfaces of this transfer sheet. Obtained results were similar to the results obtained in Example 1.

EXAMPLE 10

A composition having the following recipe was prepared as a coating liquid for forming a toner-receiving layer:

| | |
|---|---|
| Water | 500 g |
| Silica (AEROSIL #200 manufactured by Nippon Aerosil K.K.) | 30 g |
| Acrylic resin (POLYSOL M-17 manufactured by Showa Kobunshi K.K.) | 300 g |
| Epoxy resin (DENACOL EX-810 manufactured by Nagase Sangyo K.K.) | 50 g |

This composition was sufficiently dispersed for about 5 minutes by a homogenizing mixer and coated on one surface of a raw paper for production of a photosensitive paper (manufactured by Sanyo Kokusaku Pulp K.K., base weight=58 g/m$^2$) in a dry coat amount of about 5 g/m$^2$ by a rod bar coater (the rod bar diameter being 0.3 mm). The coated paper was dried at 120° C. for 1 minute to obtain a transfer sheet for electrostatic photography or electrostatic printing.

Separately, a composition having the following recipe was prepared as a back surface-coating liquid:

| | |
|---|---|
| Water | 500 g |
| Pigment (ULTRA-WHITE 90 manufactured by Engel Hard Co. Ltd.) | 30 g |
| Acrylic resin (MOVINYL DC manufactured by Hoechst Gosei K.K.) | 60 g |
| Electrically conductive resin ECR-34 manufactured by Dow Chemical Co. Ltd.) | 50 g |

This coating composition was coated on the back surface of the above transfer sheet in a dry coat amount of about 5 g/m$^2$ by a rod bar coater (the rod bar diameter being 0.3 mm), and the coated sheet was dried to obtain a transfer sheet for electrostatic photography or electrostatic printing having a toner-receiving layer In the same manner as described in Example 1, the transfer operation was conducted on the toner-receiving layer of this transfer sheet. Obtained results were similar to the results obtained in Example 1.

EXAMPLE 11

In the same manner as described in Example 1, a transfer sheet was prepared by using rutile type titanium dioxide (TITONE R-650 manufactured by Sakai Kagaku K.K.) instead of silica used in Example 1 (AEROSIL #200 manufactured by Nippon Aerosil K.K.). In the same manner as described in Example 1, the transfer operation was conducted on this transfer sheet. Obtained results were similar to the results obtained in Example 1.

What we claim is:

1. A transfer sheet for electrostatically transferring thereon an electrically conductive or electrically semiconductive toner in electrostatic photography or electrostatic printing, which comprises a substrate and a toner-receiving layer formed on at least one surface of said substrate, said toner-receiving layer containing a composition comprising (A) a thermoplastic acrylic polymer having a carboxyl group content of 2 to 30% by weight and (B) a thermosetting resin reactive with said acrylic polymer (A), said thermosetting resin (B) being a glycidyl ether of a polyalkylene polyol having an epoxy equivalent of 100 to 400, said thermoplastic acrylic resin (A) and said thermosetting resin (B) being present at an (A)/(B) weight ratio ranging from 100/5 to 100/100 based on solids.

2. A transfer sheet as set forth in claim 1 wherein said thermoplastic acrylic polymer (A) is a copolymer composed of 4 to 60% by weight of an ethylenically unsaturated carboxylic acid and 40 to 96% by weight of an ethylenically unsaturated monomer other than said ethylenically unsaturated carboxylic acid.

3. A transfer sheet as set forth in claim 1 wherein said ethylenically unsaturated monomer other than said ethylenically unsaturated carboxylic acid is a member selected from the group consisting of styrene, acrylic acid esters and methacrylic acid esters.

4. A transfer sheet as set forth in claim 1 wherein said thermoplastic acrylic polymer (A) is a copolymer composed of (a) 4 to 60% by weight of units represented by the following formula:

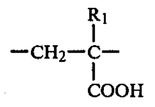

wherein $R_1$ stands for a hydrogen atom or a lower alkyl group having up to 4 carbon atoms, and (b) 40 to 96% by weight of units represented by the following formula:

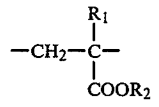

wherein $R_1$ is as defined above and $R_2$ stand for a lower alkyl group having up to 4 carbon atoms.

5. A transfer sheet as set forth in claim 4 wherein said units (b) are composed of 1 part by weight of methacrylic acid ester units and 0.02 to 0.6 part by weight of acrylic acid ester units.

6. A transfer sheet as set forth in claim 1 wherein said thermoplastic acrylic polymer (A) is a copolymer composed of (a) 4 to 60% by weight of units represented by the following formula:

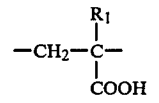

wherein $R_1$ stands for a hydrogen atom or a lower alkyl group having up to 4 carbon atoms, (b) 10 to 75% by weight of units represented by the following formula:

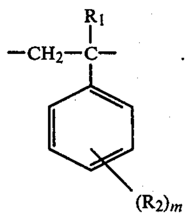

wherein $R_1$ is as defined above, $R_2$ stands for a lower alkyl group having up to 4 carbon atoms, and m is 0 or 1, and (c) 0 to 86% by weight of units represented by the following formula:

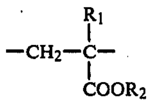

wherein $R_1$ and $R_2$ are as defined above.

7. A transfer sheet as set forth in claim 1 wherein said composition comprises finely divided silica prepared according to the dry method in an amount of 10 to 100 parts by weight per 100 parts by weight of said thermoplastic acrylic polymer (A).

8. A transfer sheet as set forth in claim 1 wherein said composition comprises rutile type titanium dioxide in an amount of 10 to 500 parts by weight per 100 parts by weight of said thermoplastic acrylic polymer (A).

9. A transfer sheet as set forth in claim 1 wherein the substrate is a paper substrate.

10. A transfer sheet as set forth in claim 1 wherein the toner-receiving layer is formed on the substrate in a coat amount of 2 to 20 g/m$^2$.

11. A transfer sheet as set forth in claim 1 wherein the saturation voltage retain ratio under high humidity conditions ($R\gamma$), which is defined by the following formula:

$$R\gamma = V_{100}/V_{40}$$

wherein $V_{40}$ indicates the saturation voltage of the transfer sheet as measured at a temperature of 20° C. and a relative humidity of 40% and $V_{100}$ represents the saturation voltage of the transfer sheet as measured at a temperature of 40° C. and a relative humidity of 100%, is at least 0.7.

* * * * *